US012666356B2

(12) United States Patent
Carty et al.

(10) Patent No.: US 12,666,356 B2
(45) Date of Patent: Jun. 23, 2026

(54) ORCHESTRATING LOW-POWER MODES IN NETWORK DEVICES

(71) Applicant: Cisco Technology, Inc., San Jose, CA (US)

(72) Inventors: Clark A. Carty, Brunswick, OH (US); Kasi R. Nalamalapu, Pleasanton, CA (US); Ruifeng Xue, Shanghai (CN); Carlos Pignataro, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 361 days.

(21) Appl. No.: 18/345,453

(22) Filed: Jun. 30, 2023

(65) Prior Publication Data

US 2025/0008428 A1 Jan. 2, 2025

(51) Int. Cl.
*H04W 52/02* (2009.01)
*H04W 36/08* (2009.01)

(52) U.S. Cl.
CPC ..... *H04W 52/0206* (2013.01); *H04W 36/087* (2023.05); *H04W 52/0229* (2013.01)

(58) Field of Classification Search
CPC ......... H04W 52/0206; H04W 52/0229; H04W 52/0235; H04W 16/28; H04W 36/08;
(Continued)

(56) References Cited

U.S. PATENT DOCUMENTS

| | | | |
|---|---|---|---|
| 2009/0073481 A1* | 3/2009 | Ferlitsch | H04N 1/00896 |
| | | | 358/1.14 |
| 2013/0286920 A1* | 10/2013 | Shinoki | H04W 52/0248 |
| | | | 370/311 |

(Continued)

FOREIGN PATENT DOCUMENTS

WO 2018126377 A1 7/2018

OTHER PUBLICATIONS

International Search Report and Written Opinion for International Application No. PCT/US2024/035881, mailed Oct. 29, 2024, 16 Pages.

*Primary Examiner* — Omer S Mian
(74) *Attorney, Agent, or Firm* — Rutan & Tucker, LLP; Ravi Mohan; Marc McClain

(57) ABSTRACT

Devices, systems, methods, and processes for orchestrating and managing various lower-power modes in a variety of network devices within a network are described herein. Various network devices, such as access points may be capable of entering one or more lower-power modes of operation that utilize less electricity to operate. When initiating a lower-power mode, the various clients that the network device has been handling need to be handed off to a sibling AP nearby. However, when exiting these lower-power modes, these devices may need different amounts of time to reboot and/or resume normal operations. Thus, when deciding which clients to re-associate with the waking up network device, various considerations need to be weighed based on client needs and network device capabilities. Thus, a smart environmental controller (SEC) is utilized to coordinate these processes. The SEC can be a specialized device, or a logic distributed remotely or among the network devices.

18 Claims, 9 Drawing Sheets

(58) Field of Classification Search
CPC .......... H04W 52/0203; H04W 52/0248; Y02D
30/70
See application file for complete search history.

(56) References Cited

U.S. PATENT DOCUMENTS

| 2015/0382291 A1 | 12/2015 | Helvick et al. |
| 2018/0288702 A1 | 10/2018 | Kang et al. |
| 2019/0124596 A1 | 4/2019 | Cao et al. |
| 2019/0159124 A1 | 5/2019 | Cho et al. |
| 2021/0321283 A1 | 10/2021 | Monajemi et al. |
| 2022/0286957 A1* | 9/2022 | Berliner ............ H04W 52/0206 |

* cited by examiner

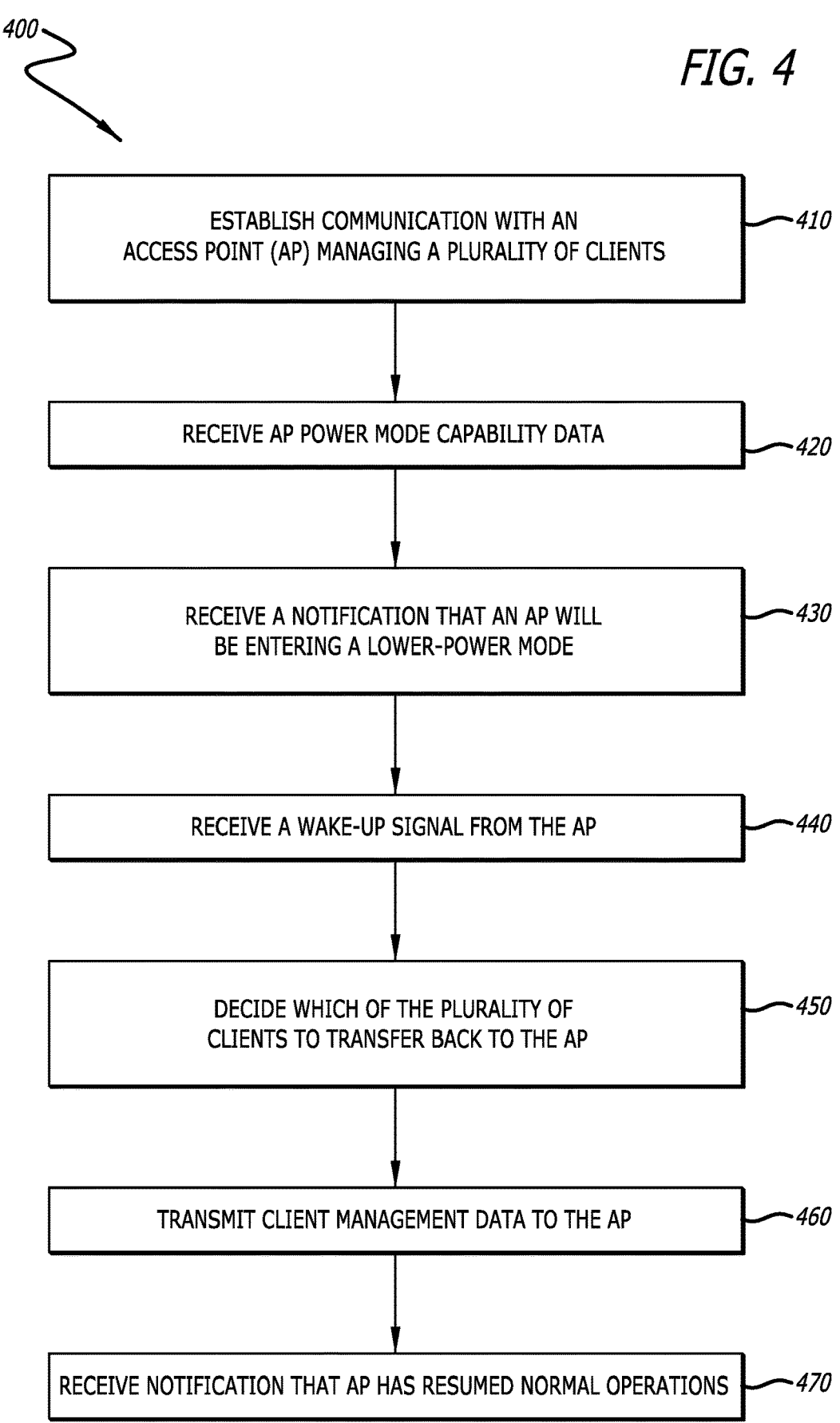

ESTABLISH COMMUNICATION WITH AN
ACCESS POINT (AP) MANAGING A PLURALITY OF CLIENTS — 410

RECEIVE AP POWER MODE CAPABILITY DATA — 420

RECEIVE A NOTIFICATION THAT AN AP WILL
BE ENTERING A LOWER-POWER MODE — 430

RECEIVE A WAKE-UP SIGNAL FROM THE AP — 440

DECIDE WHICH OF THE PLURALITY OF
CLIENTS TO TRANSFER BACK TO THE AP — 450

TRANSMIT CLIENT MANAGEMENT DATA TO THE AP — 460

RECEIVE NOTIFICATION THAT AP HAS RESUMED NORMAL OPERATIONS — 470

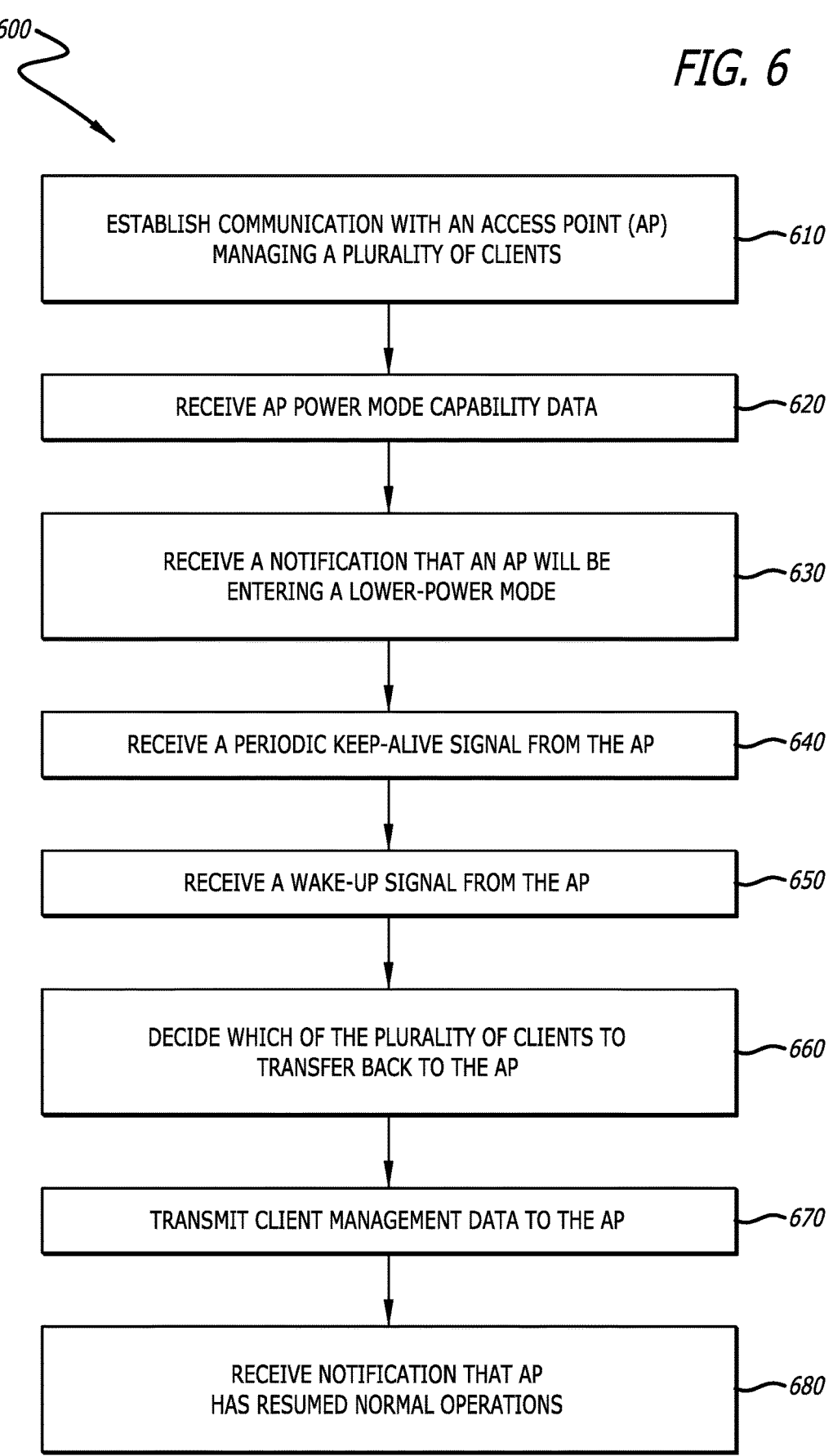

ESTABLISH COMMUNICATION WITH AN ACCESS POINT (AP)
MANAGING A PLURALITY OF CLIENTS                    610

RECEIVE AP POWER MODE CAPABILITY DATA              620

RECEIVE A NOTIFICATION THAT AN AP WILL BE
ENTERING A LOWER-POWER MODE                        630

RECEIVE A PERIODIC KEEP-ALIVE SIGNAL FROM THE AP   640

RECEIVE A WAKE-UP SIGNAL FROM THE AP               650

DECIDE WHICH OF THE PLURALITY OF CLIENTS TO
TRANSFER BACK TO THE AP                            660

TRANSMIT CLIENT MANAGEMENT DATA TO THE AP          670

RECEIVE NOTIFICATION THAT AP
HAS RESUMED NORMAL OPERATIONS                      680

940 — LOCAL AREA NETWORK

900

DEVICE(S)

912 — NETWORK INTERFACE CONTROLLER

916 — INPUT/OUTPUT CONTROLLER

906 — CHIPSET

904 — PROCESSOR(S)

908 — RAM

910 — ROM

914 — STORAGE CONTROLLER

918 — STORAGE

920 — OPERATING SYSTEM

922 — APPLICATIONS

924 — SMART ENVIRONMENTAL CONTROLLER LOGIC

926 — MACHINE-LEARNING MODEL

928 — AP POWER MODE CAPABILITY DATA

930 — CLIENT MANAGEMENT DATA

932 — TOPOLOGY DATA

902 — ENVIRONMENT

ORCHESTRATING LOW-POWER MODES IN NETWORK DEVICES

The present disclosure relates to networking. More particularly, the present disclosure relates to orchestrating and managing various lower-power modes in a variety of network devices within a network.

BACKGROUND

Traditional network devices were operated either in an on state or an off state. While attempting to save power in this scenario is easy to determine because the only available lower-power mode was to turn off the network device, that device may require several minutes to reboot and resume normal operations. Because network conditions can change rapidly, this meant that there was a lot of risk involved in activating a lower-power state in the network as these changes may be sudden enough to result in sub-optimal network functionality. Thus, clients may not have the needed throughput to communicate or function properly over the network and one or more service level agreements (SLAs) may not be met.

Eventually, new network devices were made with sleep, hibernation, or other lower-power modes. However, these devices are not standardized and thus the amount of time needed to reboot from sleep or hibernation may vary. This can lead to problems orchestrating the correct power cycling and client handoff between devices as they enter and exit a lower-power mode. As a result, client throughput and service level needs may still not be met, leading network administrators to still hesitate to utilize lower-power modes in a manner that is optimal.

SUMMARY OF THE DISCLOSURE

Systems and methods for orchestrating and managing various lower-power modes in a variety of network devices within a network in accordance with embodiments of the disclosure are described herein.

In some embodiments, techniques described herein relate to a device that includes a processor, and at least one network interface controller configured to provide access to a network, and a memory communicatively coupled to the processor. The memory includes a smart environmental controller logic that is configured to establish communication with an access point (AP) via the at least one network interface controller. The AP is associated with a plurality of clients and receives AP power mode capability data which may be parsed. The AP may receive a notification that the AP will enter a lower-power mode, and receive a wake-up signal from the AP. The parsed AP power mode capability data may be utilized to determine which of the plurality of clients should be transferred back to the AP upon wake-up. Client management data may be generated based on the determined plurality of clients, and transmitted or otherwise communicated to the AP.

In some embodiments, the AP power mode capability data is received from the AP.

In some embodiments, the AP power mode capability data includes one or more low power settings available within the AP.

In some embodiments, the one or more low power settings include at least entering a lower-power mode, entering a hibernation mode, or powering down the AP.

In some embodiments, the client management data includes a list of clients that should be re-associated with the AP upon wake-up.

In some embodiments, the AP is associated with one or more sibling APs within communication range of the AP.

In some embodiments, the clients to be re-associated are associated with the one or more sibling APs.

In some embodiments, smart environmental controller logic is further configured to receive a notification that the AP has resumed normal operations.

In some embodiments, a network device, includes a processor, and at least one network interface controller configured to provide access to a network. A plurality of clients may be serviced by the network device. A memory is communicatively coupled to the processor. The memory includes a smart environmental controller logic that is configured to establish communication with an external smart environmental controller (SEC) via the at least one network interface controller, generate AP power mode capability data, transmit the AP power mode capability data to the SEC, determine that it is suitable to initiate a lower-power mode, transmit a notification to the SEC that the lower-power mode is being initiated, enter the lower-power mode, initiate wake up from the lower-power mode, transmit a wake-up signal to the SEC, receive client management data from the SEC, and re-establish an association with the clients indicated within the client management data.

In some embodiments, the smart environmental controller logic is further configured to transmit a notification to the SEC that normal operations have resumed.

In some embodiments, the AP power mode capability data includes one or more low power settings available within the AP.

In some embodiments, the network device is associated with one or more sibling network devices.

In some embodiments, the smart environmental controller logic is further configured to transmit a notification to the one or more sibling network devices when it is determined that it is suitable to enter a lower-power mode.

In some embodiments, the one or more sibling network devices can associate with and service at least one of the plurality of clients.

In some embodiments, the smart environmental controller logic is further configured to transmit a wake-up signal to the one or more sibling devices.

In some embodiments, the re-established clients are received from the one or more sibling network devices.

In some embodiments, the smart environmental controller logic is further configured to receive additional clients from the one or more siblings network devices that are not indicated in the client management data.

In some embodiments, a method of orchestrating lower-power modes in network devices, includes establishing communication with an access point (AP), wherein the AP is associated with a plurality of clients, receiving AP power mode capability data from the AP, parsing the received AP power mode capability data to determine lower-power mode capabilities of the AP, receiving a notification that the AP will enter a lower-power mode, receiving a wake-up signal from the AP, generating client management data, and transmitting the generated client management data to the AP.

In some embodiments, the parsed AP power mode capability data is utilized to determine a plurality of client that should be transferred back to the AP upon wake-up.

In some embodiments, the client management data is generated based on the determined plurality of clients.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 4 is a flowchart depicting a process for a smart environmental controller to orchestrate lower-power modes in accordance with various embodiments of the disclosure;

FIG. 6 is a flowchart depicting a process for a smart environmental controller to orchestrate network devices when the network device cannot enter a lower-power mode in accordance with various embodiments of the disclosure;

Figure 1:
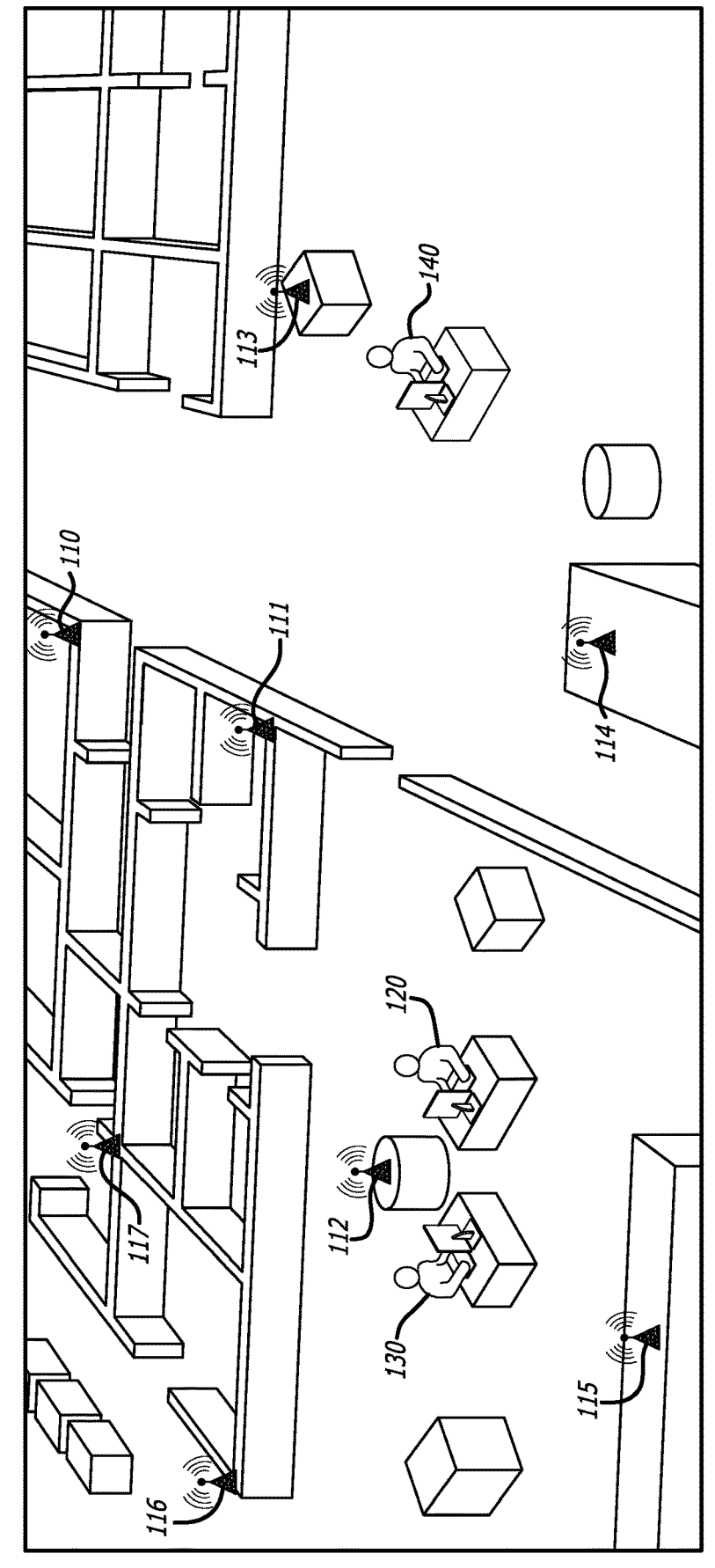
FIG. 1 is a conceptual illustration of a deployment of network devices suitable for orchestrating within one or more lower-power modes via a smart environmental controller in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that utilize a smart environmental controller to efficiently orchestrate lower-power modes wakeups and allow for increased utilization of these lower-power modes with fewer client handoff issues. Many current systems utilize sleep cycles to put network devices into a lower power state when they are not needed. The levels of sleep can vary, and the times needed to boot up on wake after sleep can also vary. However, the need for services by a client upon wake may be instant as the wake command might have been issued in response to a needed resource or service. Upon wake, various actions can be done to quickly utilize and reactive activity within the AP. This can be orchestrated by the smart environmental controller, or via actions or messages by other APs in the deployment area (that is, a virtual, distributed, smart environmental controller function).

There are several actions network devices could be configured to do on wake. Often, the intent is to rapidly converge into an active state within the AP. These actions may include understanding which clients should migrate back to the AP exiting the lower-power mode. In some embodiments, this can be done by utilizing a 3D mapping, or by determining if the client was on that AP previously, etc. Specifically, we can determine a "previous association" state and re-establish an association or "re-associate" the client back to the AP exiting the lower-power mode. This can be driven by a controller tracking the floorplan locations of clients which are in the area of restoral upon waking from sleep. Further actions may include opportunistically moving clients to the re-energized AP when no L2 flows are currently active. This can be done by a wired LAN controller (WLC) or even peer, or "sibling" APs pushing BTS or other similar messages. In more embodiments, the actions can include moving clients proactively or plan for future client movement.

While power states are often thought of as binary states, sleep/awake, there are in reality some in-between states that clearly help with the compromise between reliability (or quality of service) and power efficiency. We should have the ability to put an AP/device into some appropriate intermediate states so that a reboot is not necessary upon PoE re-powering. All that is needed is a resumption of PoE power to come up to an ideal state which makes AP/device restoration better than we have today. For example, hibernation mode with periodic neighbor checks or partial shutdown of an AP or a network device, meaning all radios are off, and the AP/network device participates in routing traffic off from it, or the radios be called into an on state via in-band signaling from a peer or sibling AP. To facilitate this profile, corresponding hardware and software features can be turned on or off accordingly.

As those skilled in the art will recognize, there are multiple levels of sleep. In many embodiments, the amount of CPUs/CPU cores, DRAM, or other hardware resources can be powered down when in sleep mode. The cores and DRAM may be able to all be put to sleep, or maybe a single core and DRAM still needs enabled for various activities or network state monitoring, etc. In some cases, a complete shutdown of the AP is necessary, with the caveat that it could take around 5 minutes or more for the AP to complete rebooting. We help avoid this by orchestrating the lower-power modes by utilizing proactive inspecting of maps and client needs, as well as examine historical trends and AP or network device capabilities.

If there are another APs covering the AP needing a full reboot or shutdown, then it can often be afforded to do the longer shut down. While this AP is being brought to service, the users and clients are covered as it will be temporary until the rebooted AP is fully in service. This relationship creates a sibling AP or sibling network device which can be configured to cover for downtime needs and provide additional support and/or handing off of clients based on the lower-power mode capabilities of that network device.

In certain embodiments, one or more protocols may need to be modified, such as, but not limited to CAPWAP, which may need to be configured to avoid looking for an AP that is going into a sleep mode with a periodic keep alive signal. Additionally, various embodiments can be extended to other network devices beyond APs. This can also apply to the idea of lower-power modes in switches or other network devices to save power for the entire Wi-Fi system. For example, existing switches may have some power saving features, but do not seem to have a sleep mode yet such as a 48-port POE switch. There, even without POE, the switch may require about 58 W to maintain basic operation. In additional embodiments, 10 wake-on-LAN (WOL) or equivalent devices are currently sleeping as deep as possible, and a single Proxy piece of software maintains adjacencies or states. The software could be configured to be able to wake-up the sleeping devices/radios as needed. In this way, the 10 WOL high-power-drawing devices can be configured to save a lot of power, and the software can proxy on behalf of all of them.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a deployment of network devices suitable for orchestrating within one or more lower-power modes via a smart environmental controller in accordance with various embodiments of the disclosure is shown. In many embodiments, a floorplan 100 can be selected for orchestrating one or more lower-power modes between various access points. Although the floorplan 100 depicted in the embodiment of FIG. 1 is an office environment, it is contemplated that a floorplan may be any environment that includes a plurality of access points distributed throughout an area. In additional embodiments, an area may have multiple floorplans and access points may be associated with multiple floorplans. Indeed, in certain embodiments, a floorplan may be defined as a collection of access points and the area that those access points cover.

In the embodiment depicted in FIG. 1, the floorplan 100 has a first access point 110 at an entranceway to the area. Likewise, a second access point 111 can be placed centrally within the floorplan 100. Within the floorplan 100, three people are depicted working at desk workstations. The first person 120 and second person 130 are working next to a third access point 112. A third person 140 is working next to a fourth access point 113. Additional access points are distributed throughout the floorplan 100 to provide additional wireless signal coverage including a fifth access point 114, a sixth access point 115, a seventh access point 116, and an eighth access point 117.

Traditionally, all access points may be fully powered and operating throughout the day. However, within the embodiment of FIG. 1, the first person 120 and second person 130 may be fully served by the third access point 112. Similarly, the third person 140 may be fully served by the connection provided by the fourth access point 113. Therefore, as described in more detail below, a number of access points may be selectively powered down or de-energized into a lower-power mode. This powering down may include powering down the entire unit to a sleep mode but may also include powering down one or more transceivers within the access point. In a number of embodiments, the access points can be configured with multiple transceivers that are configured for different bands of usage. These bands of usage may be a higher-frequency band, or a lower-frequency band. The higher-frequency band may provide enhanced signal readings and data transfer throughput, but often require additional energy to operate at a similar range compared to a transceiver configured for use on a lower-frequency band.

Powering down access points and/or their transceivers can provide significant savings in overall electricity usage within the floorplan 100. However, powering down these elements within a network can cause problems when additional traffic suddenly enters the floorplan 100. For example, additional people may walk into the floorplan 100 from an outside area. If the first access point 110 was powered down into a sleep mode, there may be situations where the time it takes to wake from the sleep mode is too long to provide adequate coverage and/or service to the additional people. This can negatively affect service level agreements (SLAs) as well as the overall user experience. Thus, in a variety of embodiments, any powering down within the floorplan 100 should be weighed against the time it may take to sufficiently satisfy a sudden increase in network traffic against the amount of time that may be needed to reboot or bring back online the network devices that are in a lower-power mode.

As a result, in the embodiment depicted in FIG. 1, a potential minimal energization configuration may be orchestrated by a smart environmental controller to include operating the first access point 110 at a lower-power setting until it detects additional people entering the floorplan 100, which can trigger a higher-power setting based on the capabilities of that device. However, the second access point 111 may be powered off into a full sleep mode because the third access point 112 is sufficiently serving the first person 120 and second person 130 while the fourth access point 113 is also sufficiently serving the third person 140. Therefore, the third access point 112 and the fourth access point 113 may be operating at full and normal capacity. The fifth access point 114, sixth access point 115, seventh access point 116, and eighth access point 117 may also power down into a lower-power mode until one or more triggering events occurs to initiate an orchestration of the devices to hand off or re-associate clients during power up of the devices within the floorplan 100.

Although a specific embodiment for a deployment of network devices suitable for orchestrating within one or more lower-power modes via a smart environmental controller suitable for carrying out the various steps, processes, methods, and operations described herein is discussed with respect to FIG. 1, any of a variety of systems and/or processes may be utilized in accordance with embodiments of the disclosure. For example, the smart environmental controller may be a specialized device within the network or operated by a network administrator remotely from the deployed environment. In certain embodiments, the smart environmental controller may be a logic that is operated or distributed through the access points of the network. The elements depicted in FIG. 1 may also be interchangeable with other elements of FIGS. 2A-9 as required to realize a particularly desired embodiment.

Figures 2A, 2B:
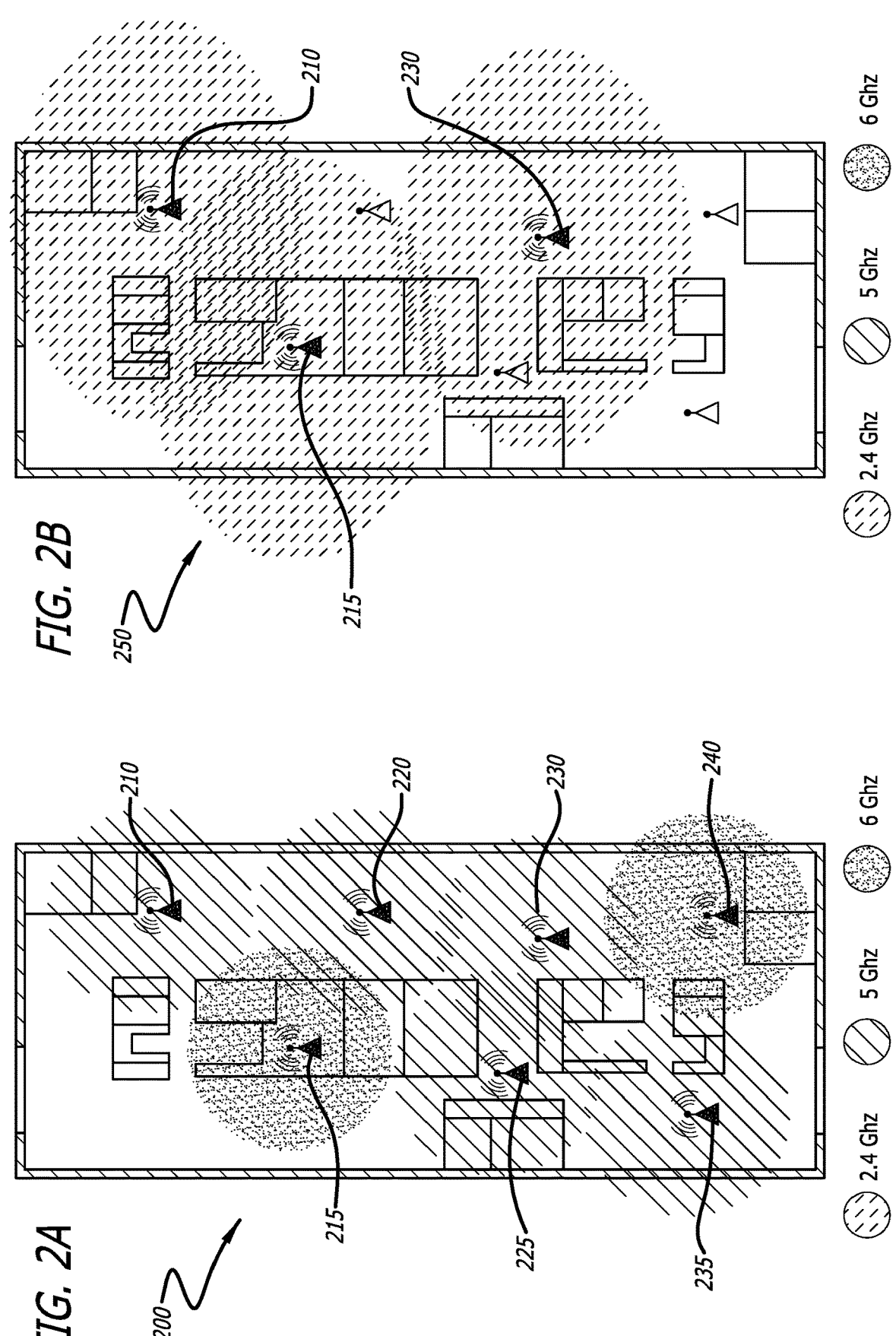
FIG. 2A is a schematic diagram of a floorplan with a plurality of network devices during normal operation in accordance with various embodiments of the disclosure.
FIG. 2B is a schematic diagram of a floorplan with a plurality of network devices during lower-power mode operation in accordance with various embodiments of the disclosure.

Referring to FIG. 2A, a schematic diagram of a floorplan with a plurality of network devices during normal operation in accordance with various embodiments of the disclosure is shown. Similar to the embodiments depicted in FIG. 1, a floorplan 200 can be configured with different access points to provide wireless network coverage over a large area within the floorplan. In additional embodiments, those APs may be further configured to provide network coverage at various frequency bands. These frequency bands can often be generated by utilizing a specialized transceiver that is configured to transmit and/or receive wireless network signals at a particular frequency band. In various embodiments, the frequency bands may include 2.4 GHz, 5 GHZ, and/or 6 GHz signals. However, it is contemplated that any frequency band may be utilized as necessary to allow for the transmission of wireless networking signals.

In the embodiment depicted in FIG. 2A, the floorplan 200 is configured with a first access point 210, a second access point 215, a third access point 220, a fourth access point 225, a fifth access point 230, a sixth access point 235, and a seventh access point 240. In the depicted embodiment, the first access point 210, third access point 220, fourth access point 225, fifth access point 230 and sixth access point 235 are each transmitting a 5 GHz wireless signal. Additionally, the second access point 215 and seventh access point 240 are transmitting wireless signals at a 6 GHz frequency band. However, during periods of low traffic/bandwidth usage, or when only a few to no people are present within the floorplan 200, this configuration may be inefficient, and one or more access points may be put into a lower-power mode.

Thus, there may be a desire to power down or initiate a lower-power mode not only one or more APs within the floorplan 200, but to also power down one or more transceivers/antennas configured with different frequency bands. Similar to the embodiments described above with respect to FIG. 1, a smart environmental controller or similar management tool may be configured to gather relevant data and orchestrate various lower-power modes and re-associating clients afterwards to all APs associated with the floorplan to achieve a lower-energy-using state with increased client usage reliability. However, based on one or more current or future events or after a predetermined amount of time, a reassessment may occur to determine if the lower-power mode orchestration needs to be adjusted. In certain embodiments, event-based data or other client management data may be parsed or otherwise mined to predict when a change in usage or client needs may occur, which could trigger a reassessment of the necessary lower-power mode orchestration necessary to provide sufficient coverage and service levels to users while minimizing the transceivers and/or APs necessary to provide said coverage, including powering on one or more frequency band transceivers within one or more APs.

Referring to FIG. 2B is a schematic diagram of a floorplan 250 with a plurality of network devices during lower-power mode operation in accordance with various embodiments of the disclosure is shown. In many embodiments, the floorplan 250 depicted in FIG. 2B is similar to the floorplan 200 of FIG. 2A but has a lower-power mode configuration applied. This lower-power mode configuration in FIG. 2B results in the first access point 210, second access point 215, and fifth access point 230 remaining active while the remaining APs are powered down.

Additionally, within the first access point 210, second access point 215, and fifth access point 230, the respective 5 GHz and 6 GHz transceivers have been powered down. As a result, only the 2.4 GHz transceivers are active within the embodiment of FIG. 2B. In these embodiments, the lower-power mode configuration can be designed to provide coverage over a majority of the floorplan 250 with just the 2.4 GHz signal. Thus, the selection of active APs can be spread out of the floorplan 250. In this configuration, a user with a client device may still be able to connect to the wireless network at most any location within the floorplan 250. However, if it is detected that more users may be predicted to enter the floorplan 250 or that an application on a client device may require increased bandwidth, additional frequency bands or APs may be powered on to continue providing a sufficient user experience and handoff orchestrated based on the available network device capabilities.

Although specific embodiments are described above with respect to FIGS. 2A and 2B, any of a variety of systems and/or processes may be utilized in accordance with embodiments of the disclosure. For example, the access points may be directed to exit lower-power modes in response to a predefined schedule or when historical patterns indicate that increased usage is likely to occur. The aspects described in FIGS. 2A and 2B may also be interchangeable with other elements of FIGS. 1 and 3-9 as required to realize a particularly desired embodiment. Embodiments that reconfigure APs in response to predicted or determined events are described below.

Figure 3:
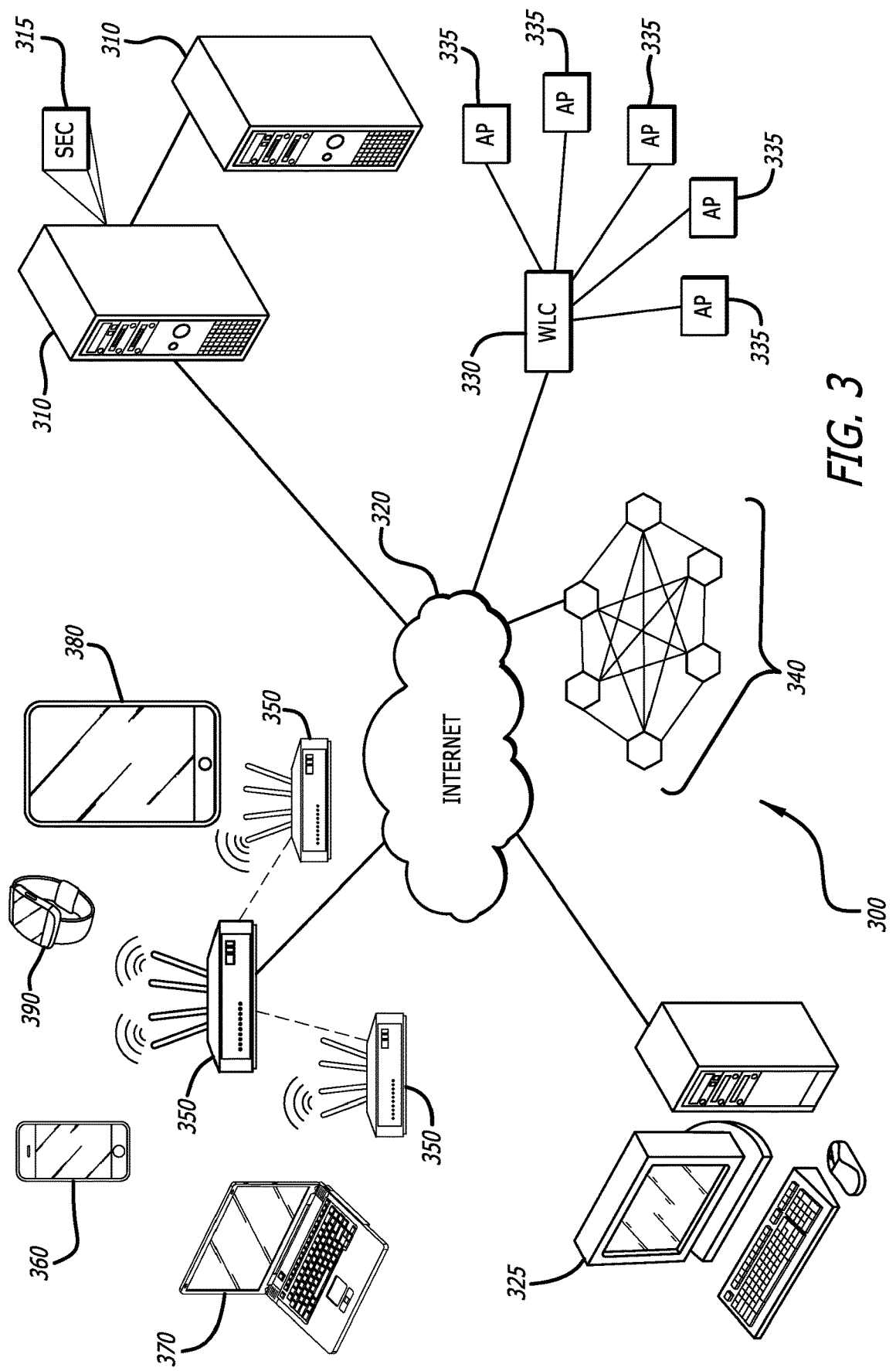
FIG. 3 is a conceptual network diagram of a various environments that a smart environmental controller may operate on a plurality of network devices in accordance with various embodiments of the disclosure.

Referring to FIG. 3, a conceptual network diagram of various environments that a smart environmental controller may operate on a plurality of network devices in accordance with various embodiments of the disclosure is shown. Those skilled in the art will recognize that the smart environmental controller can be comprised of various hardware and/or software deployments and can be configured in a variety of ways. In some non-limiting examples, the smart environmental controller can be configured as a standalone device, exist as a logic in another network device, be distributed among various network devices operating in tandem, or remotely operated as part of a cloud-based network management tool.

In many embodiments, the network 300 may comprise a plurality of devices that are configured to transmit and receive data for a plurality of clients. In various embodiments, cloud-based network management servers 310 are connected to a wide-area network such as, for example, the Internet 320. In further embodiments, cloud-based network management servers 310 can be configured with or otherwise operate a smart environmental controller (shown as SEC) 315. The SEC 315 can be provided as a cloud-based service that can service remote networks, such as, but not limited to the deployed network 340. In these embodiments, the SEC 315 can be a logic that receives data from the deployed network 340 and orchestrates lower-power modes between network devices. The SEC 315 can generate client management data in various embodiments and transmit that back to one or more network devices within the deployed network 340.

However, in additional embodiments, the smart environmental controller may be operated as distributed logic across multiple network devices. In the embodiment depicted in FIG. 3, a plurality of network access points (APs) 350 can operate as a smart environmental controller in a distributed manner or may have one specific device orchestrate the lower-power modes for all of the neighboring or sibling APs 350. This lower-power mode orchestration can be utilized to facilitate sufficient client throughput from clients being utilized on various devices. These devise may include but are not limited to mobile computing devices including laptop computers 370, cellular phones 360, portable tablet computers 380 and wearable computing devices 390.

In still further embodiments, the smart environmental controller may be integrated within another network device. In the embodiment depicted in FIG. 3, the wireless LAN controller 330 may have an integrated smart environmental controller that it can use to orchestrate lower-power mode activities within the various APs 335 that it is connected to, either wired or wirelessly. In this way, the APs 335 can hand off and re-associated with clients when entering or exiting a lower-power mode based on the client management data generated by and sent from the WLC 330. In still more embodiments, a personal computer 325 may be utilized to access and/or manage various aspects of the smart environmental controller, either remotely or within the network itself. In the embodiment depicted in FIG. 3, the personal computer 325 communicates over the Internet 320 and can access the SEC 315, or the network APs 350, or the WLC 330 to modify or otherwise monitor the smart environmental controllers.

Although a specific embodiment for a various environments that a smart environmental controller may operate on a plurality of network devices suitable for carrying out the various steps, processes, methods, and operations described herein is discussed with respect to FIG. 3, any of a variety of systems and/or processes may be utilized in accordance with embodiments of the disclosure. For example, the network being orchestrated may be distributed or comprise various different layouts requiring one or more smart environmental controllers that may themselves communicate on a macro scale as needed. The elements depicted in FIG. 3 may also be interchangeable with other elements of FIGS. 2B-9 as required to realize a particularly desired embodiment.

Referring to FIG. 4, a flowchart depicting a process 400 for a smart environmental controller to orchestrate lower-power modes in accordance with various embodiments of the disclosure is shown. In many embodiments, the process 400 can establish a communication with an access point (AP) managing a plurality of clients (block 410). As discussed above, the AP may be managing data for a number of clients, each of which may require or less data throughput. The communication may be established with the AP through one or more of the wireless connections to the AP but may also be through a hard-wired connection to a different managing device, such as a wired LAN controller (WLC), for example.

In a number of embodiments, the process 400 can receive AP power mode capability data (block 420). Often, this data is received from the AP directly. However, there may be embodiments where the data is stored elsewhere or may be retrieved from a database based on the determined model and/or firmware of the AP or network device. In more embodiments, the AP power mode capability data can be comprised of data indicating what lower-power mode capabilities may be available or possible on that specific AP or network device.

In additional embodiments, the process 400 can receive a notification that an AP will be entering a lower-power mode (block 430). Often, APs or other network devices may be configured to self-determine (or be signal from an external device) that it is suitable to enter a lower-power mode. Prior to this occurring, a signal can be sent out to various other devices on the network that may require actions to facilitate the initiation of the lower-power mode.

In more embodiments, the process 400 may receive a wake-up signal from the AP (block 440). After some amount of time, the AP can decide or respond to a request or other trigger to power back on or otherwise resume normal operations by exiting the lower-power mode. Similar to initiating lower-power mode, the AP or network device can transmit a signal to various other devices on the network that may require one or more actions to take place once the AP has fully resumed normal operations.

In a number of embodiments, the process 400 can decide which of the plurality of clients to transfer back to the AP or network device (block 450). The clients that were previously associated with the AP or network device may have been passed off to a sibling AP or other neighboring network device. The smart environmental controller can be configured to have access to which clients were previously handled by the waking-up AP, and which are currently handled by the sibling APs, as well as the client types and/or throughput demand. Based on at least these factors, the process 400 can determine which ones may be best suited to be re-associated with the waking-up AP based on, in part, the type of lower-power mode utilized by the waking-up AP.

In various embodiments, the process 400 can transmit the client management data to the AP (block 460). The transmission can, in certain embodiments, be done as the AP or network device is still booting up from the lower-power mode. However, other APs or network devices may require to be fully operational before client management data can be received and/or parsed.

In still more embodiments, the process 400 can receive a notification that the AP or network device has resumed normal operations (block 470). This notification may include an acknowledgement that the client management data was received, and the indicated clients were successfully re-associated and/or transferred back to the AP/network device. In more embodiments, the process 400 may not require that the AP has resumed normal operations.

Although a specific embodiment for a smart environmental controller to orchestrate lower-power modes suitable for carrying out the various steps, processes, methods, and operations described herein is discussed with respect to FIG. 4, any of a variety of systems and/or processes may be utilized in accordance with embodiments of the disclosure. For example, the process may be done via a standalone device, as part of a group of logics located within sibling APs, or via cloud-based service through a network administration suite. The elements depicted in FIG. 4 may also be interchangeable with other elements of FIGS. 1-3 and 5-9 as required to realize a particularly desired embodiment.

Figure 5:
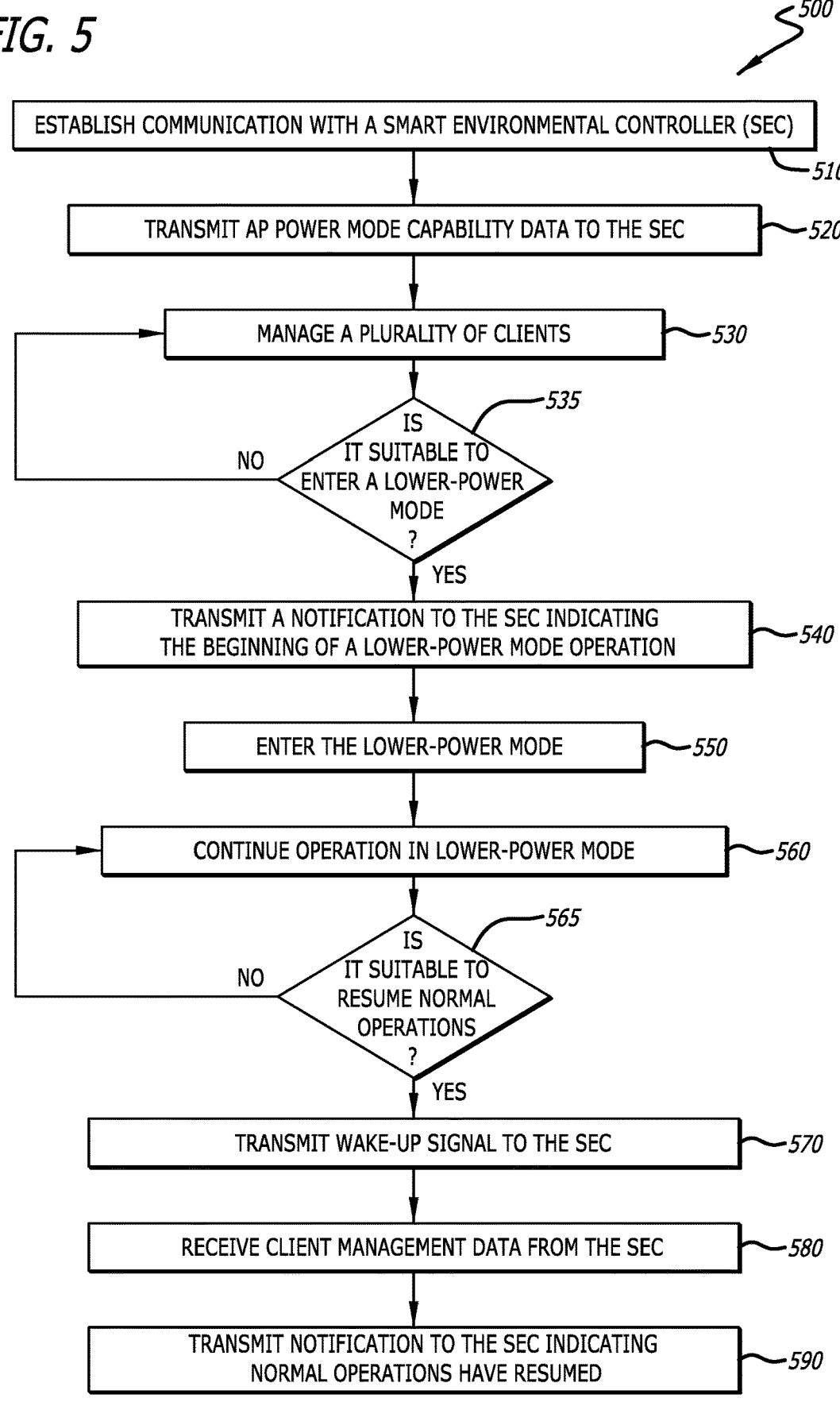
FIG. 5 is a flowchart depicting a process for operating a network device with a smart environmental controller in accordance with various embodiments of the disclosure.

Referring to FIG. 5, a flowchart depicting a process 500 for operating a network device with a smart environmental controller in accordance with various embodiments of the disclosure is shown. In many embodiments, the process 500 can establish communication with a smart environmental controller (SEC) (block 510). In some embodiments, an AP or other network device may be deployed within an already existing network that has an SEC operating within or with it. As such, the SEC may be a separate device within the network or may reside as a logic within a particular network device. In even further embodiments, the SEC may be a cloud-based software network administration suite or may be a distributed logic that resides in part on at least two or more other network devices, such as sibling APs.

In a number of embodiments, the process 500 can transmit AP power mode capability data to the SEC (block 520). This AP power mode capability data may be generated by determining the available lower-power modes available within the network device and formatting that data into AP power mode capability data that can be transmitted to the SEC. However, in certain embodiments, AP power mode capability data may not need to be transferred, especially in legacy devices that may not support this feature. In these embodiments, the SEC may be able to gather the data in other ways such as accessing a database based on known manufacturer and model of the network device, or, in some cases, by assuming that no lower-power modes are available.

In additional embodiments, the process 500 can manage a plurality of clients (block 530). The AP or network device can often be configured to manage and/or direct traffic for a number of clients or other devices/stations deployed within the networking environment. For example, an AP may be processing a number of wireless network devices through one or more wireless signal protocols. Each client may require a different level of throughput or connection reliability.

In more embodiments, the process 500 can determine if is suitable to enter a lower-power mode (block 535). Based on various triggers, such as a heuristic rule set, or one or more machine learning processes, the AP or network device can be directed, or direct itself, to enter a lower-power mode. By way of non-limiting example, the traffic or number of clients associated with the client may drop below a particular predetermined threshold. When it is not suitable to enter a lower-power mode, the process 500 can continue to manage the plurality of client (block 530).

However, when the process 500 determines that it is suitable to enter a lower-power mode, a notification can be transmitted to the SEC indicating the beginning of a lower-power mode of operation (block 540). In these embodiments, the notification can be sent prior to entering lower-power mode or can be sent as the lower-power mode is being initiated. The notification can be configured as a direct message to the SEC or may be a general broadcast to the network of which the SEC may be able to receive and process. In still further embodiments, the network device can additionally transmit the notification to neighboring or sibling APs or network devices.

In further embodiments, the process 500 can enter the lower-power mode (block 550). This is often done based on the capabilities provided by the manufacturer or firmware version. As discussed above, there are a number of different levels of lower-power modes which can include different amounts of power usage.

In still more embodiments, the process 500 can continue operation within the lower-power mode (block 560). Based on the type of lower-power mode, various steps can be done during the lower-power mode such as sending "keep alive" signals to the network or checking one or more conditions regarding the state of the network. In some embodiments, the lower-power mode may be a total shut down and no operations are done.

At some point during the operation of the lower-power mode, the process 500 can determine if it is suitable to resume normal operations (block 565). In other words, is it safe or needed to exit the lower-power mode. As discussed above, this can be triggered by a variety of events such as, but not limited to, a sudden change in the network state, a change in client needs, a change in neighboring or sibling APs, reception of a power over ethernet (POE) signal or from a signal received from one or more transceiver signals. If it is not suitable to resume normal operations, the process 500 can continue operation in lower-power mode (block 560).

However, when the conditions are suitable to resume normal operations, the process 500 can transmit a wake-up signal to the SEC (block 570). The wake-up signal can be transmitted prior to the wake-up process beginning (to indicate it will start to begin) or may be transmitted as the process is concluding or concluded. In certain embodiments, the signal may be transmitted directly to the SEC, however other embodiments may broadcast the message to the network, which the SEC may also receive. In still further embodiments, the network device can additionally transmit the wake-up signal to neighboring or sibling APs or network devices.

In a variety of embodiments, the process 500 can receive client management data from the SEC (block 580). As previously discussed, the client management data can comprise a list or other format of data that can indicate what clients previously associated with the AP/network device prior to entering the lower-power mode should be re-associated again. In some embodiments, the client management data may also be sent to neighboring or sibling APs or network devices in order to indicate which clients should be transferred. In certain embodiments, the sibling APs may also opportunistically transfer or re-associate clients without direct input from the SEC.

In yet further embodiments, the process 500 can transmit the notification to the SEC indicating normal operations have resumed (block 590). This notification can be transmitted directly to the SEC or may be broadcast out to the network. In some embodiments, the notification can be transmitted upon completion of the reboot or power-up process. In further embodiments, the process 500 can further indicate whether the indicated clients were successfully re-associated or otherwise transferred back to the AP/network device.

Although a specific embodiment for operating a network device with a smart environmental controller suitable for carrying out the various steps, processes, methods, and operations described herein is discussed with respect to FIG. 5, any of a variety of systems and/or processes may be utilized in accordance with embodiments of the disclosure. For example, the process may be done by an AP, switch, router, or other network device. The elements depicted in FIG. 5 may also be interchangeable with other elements of FIGS. 1-4 and 6-9 as required to realize a particularly desired embodiment.

Referring to FIG. 6, a flowchart depicting a process 600 for a smart environmental controller to orchestrate network devices when the network device may not be able to enter a lower-power mode in accordance with various embodiments of the disclosure is shown. In many embodiments, the process 600 can establish communication with an access point (AP) or other network device wherein a plurality of clients is being managed by the network device/AP (block 610).

In a number of embodiments, the process 600 can receive AP power mode capability data (block 620). Often, this data is received from the AP directly. However, there may be embodiments where the data is stored elsewhere or may be retrieved from a database based on the determined model and/or firmware of the AP or network device. In more embodiments, the AP power mode capability data can be comprised of data indicating what lower-power mode capabilities may be available or possible on that specific AP or network device.

In additional embodiments, the process 600 can receive a notification that an AP will be entering a lower-power mode (block 630). Often, APs or other network devices may be configured to self-determine (or be signal from an external device) that it is suitable to enter a lower-power mode. Prior to this occurring, a signal can be sent out to various other devices on the network that may require actions to facilitate the initiation of the lower-power mode.

However, in a variety of embodiments, the AP or network device may not be able to enter a traditional lower-power mode and may require a full shut down and/or reboot upon powering up. This may occur by design, meaning that the network device does not have any lower-power mode capability, or that an error occurred, and a planned lower-power mode initiation failed. In many of these embodiments, the AP or network device may be configured to boot up periodically, sometimes with a specialized boot ROM, to transmit a keep-alive signal to the SEC. Therefore, various embodiments may receive a keep-alive signal from the AP (block 640). This signal may be received at various periodic intervals.

In more embodiments, the process 600 may receive a wake-up signal from the AP (block 650). After some amount of time, the AP can decide or respond to a request or other trigger to power back on or otherwise resume normal operations by exiting the lower-power mode. Similar to initiating lower-power mode, the AP or network device can transmit a signal to various other devices on the network that may require one or more actions to take place once the AP has fully resumed normal operations.

In a number of embodiments, the process 600 can decide which of the plurality of clients to transfer back to the AP or network device (block 660). The clients that were previously associated with the AP or network device may have been passed off to a sibling AP or other neighboring network device. The smart environmental controller can be configured to have access to which clients were previously handled by the waking-up AP, and which are currently handled by the sibling APs, as well as the client types and/or throughput demand. Based on at least these factors, the process 600 can determine which ones may be best suited to be re-associated with the waking-up AP based on, in part, the type of lower-power mode utilized by the waking-up AP.

In various embodiments, the process 600 can transmit the client management data to the AP (block 670). The transmission can, in certain embodiments, be done as the AP or network device is still booting up from the lower-power mode. However, other APs or network devices may require to be fully operational before client management data can be received and/or parsed.

In still more embodiments, the process 600 can receive a notification that the AP or network device has resumed normal operations (block 680). This notification may include an acknowledgement that the client management data was received, and the indicated clients were successfully re-associated and/or transferred back to the AP/network device. In more embodiments, the process 600 may not require that the AP has resumed normal operations.

Although a specific embodiment for a smart environmental controller to orchestrate network devices when the network device may not be able to enter a lower-power mode suitable for carrying out the various steps, processes, methods, and operations described herein is discussed with respect to FIG. 6, any of a variety of systems and/or processes may be utilized in accordance with embodiments of the disclosure. For example, the process can evaluate the client historical needs to determine if transferring back to a fully rebooted AP or network device is suitable. The elements depicted in FIG. 6 may also be interchangeable with other elements of FIGS. 1-5 and 7-9 as required to realize a particularly desired embodiment.

Figure 7:
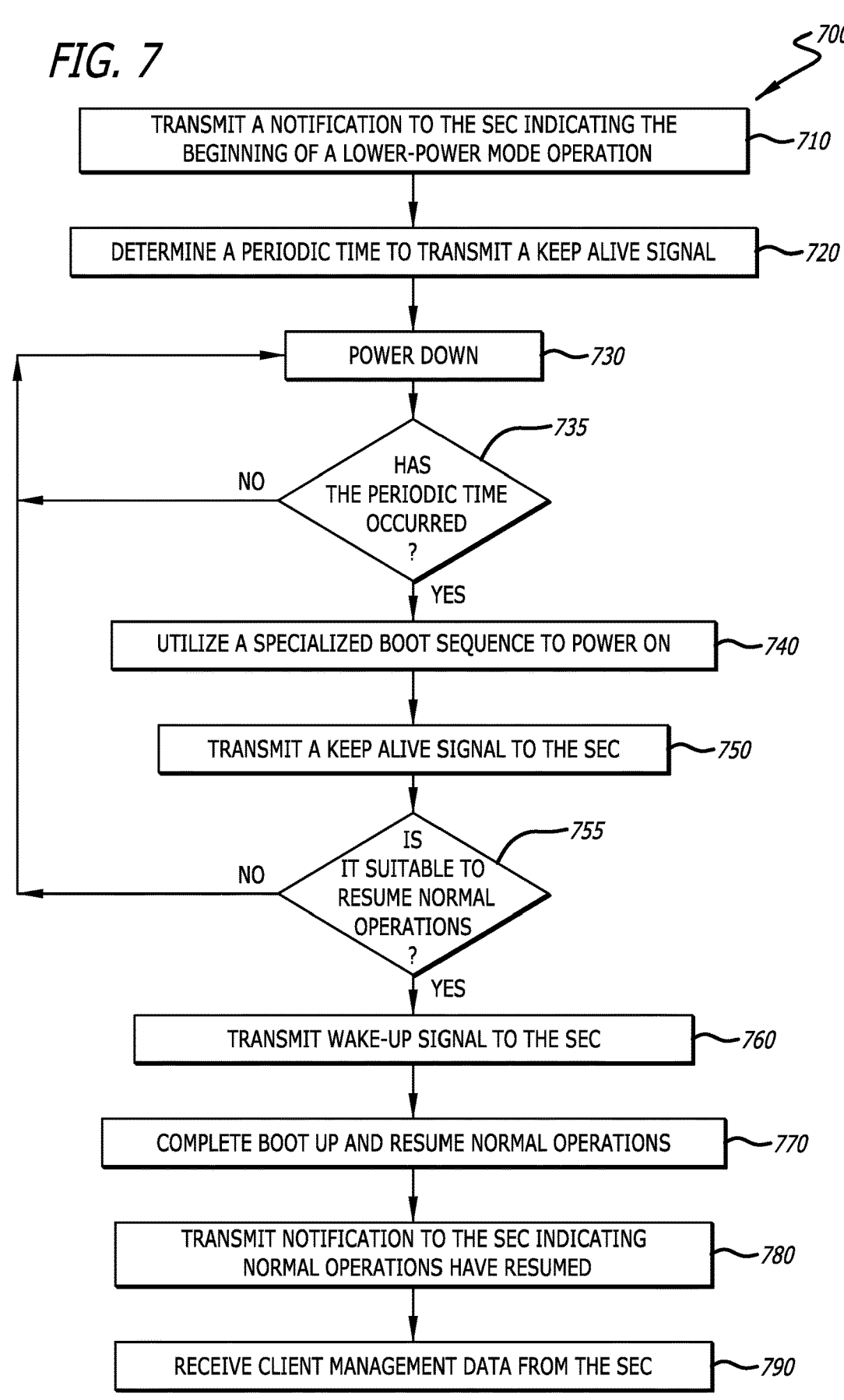
FIG. 7 is a flowchart depicting a process for operating a network device with a smart environmental controller when the network device cannot enter a lower-power mode in accordance with various embodiments of the disclosure.

Referring to FIG. 7, a flowchart depicting a process 700 for operating a network device with a smart environmental controller when the network device cannot enter a lower-power mode in accordance with various embodiments of the disclosure is shown. In many embodiments, the process 700 can be associated with an AP or network device that cannot enter a lower-power mode. Thus, instead of entering a lower-power mode, these network devices may simply be powering down entirely.

As such, in a number of embodiments, the process 700 can transmit a notification to the SEC indicating the beginning of a lower-power mode of operation (block 710). In these embodiments, the notification can be sent prior to entering lower-power mode or can be sent as the lower-power mode is being initiated. The notification can be configured as a direct message to the SEC or may be a general broadcast to the network of which the SEC may be able to receive and process. In still further embodiments, the network device can additionally transmit the notification to neighboring or sibling APs or network devices.

Prior to powering-down, the process 700 can determine a periodic time to transmit a keep alive signal (block 720). If an AP or network device powers fully down, it may still need to transmit a keep alive signal to indicate that it is still in a lower-power state and is capable of booting up in response to a triggering event. Therefore, based on a variety of factors, a keep alive signal period may be needed at a certain period of time.

In further embodiments, the process 700 can power down (block 730). In some embodiments, there may be an issue that can prevent traditional lower-power modes from being activated, requiring a full power down. In additional embodiments, the AP or network device can determine that traffic or client patterns are such that a full power down is warranted.

In more embodiments, the process 700 can determine if the periodic time has occurred (block 735). As previously discussed, a keep alive signal may need to be transmitted every so often across the network or to the SEC. When the periodic time has not occurred, the process 700 can continue to operate in a powered down state (block 730).

However, when the periodic time has occurred, the process 700 can utilize a specialized boot sequence to power on (block 740). In various embodiments, the AP or network device can avoid powering on to full capacity and instead utilize a specialized boot ROM or other power up instructions that can avoid using the full processing power of the network device. Upon boot up with the specialized boot sequence, the process 700 can transmit the keep alive signal to the SEC (block 750). In certain additional embodiments, the process 700 may also transmit the keep alive signal to neighboring or sibling APs.

In additional embodiments, the process 700 can determine if it is suitable to resume normal operations (block 755). In other words, is it safe or needed to exit the lower-power mode. As discussed above, this can be triggered by a variety of events such as, but not limited to, a sudden change in the network state, a change in client needs, a change in neighboring or sibling APs, reception of a power over ethernet (POE) signal or from a signal received from one or more transceiver signals. If it is not suitable to resume normal operations, the process 700 can continue operation in lower-power mode (block 730).

However, when the conditions are suitable to resume normal operations, the process 700 can transmit a wake-up signal to the SEC (block 760). The wake-up signal can be transmitted prior to the wake-up process beginning (to indicate it will start to begin) or may be transmitted as the process is concluding or concluded. In certain embodiments, the signal may be transmitted directly to the SEC, however other embodiments may broadcast the message to the network, which the SEC may also receive. In still further embodiments, the network device can additionally transmit the wake-up signal to neighboring or sibling APs or network devices.

In some embodiments, the process 700 can complete the full boot up and resume normal operations (block 770). At some point, various embodiments of the process 700 can transmit a notification to the SEC indicating normal operations have resumed (block 780). In some embodiments, the transmission of the notification can be done at the start of boot up or can be done after normal operations have resumed. In further embodiments, the transmission can be directly to the SEC, but may also be broadcast out to the network and/or sibling APs which can allow for the SEC or similar SEC logics to receive the notification.

In a variety of embodiments, the process 700 can also receive client management data from the SEC (block 790). As previously discussed, the client management data can comprise a list or other format of data that can indicate what clients previously associated with the AP/network device prior to entering the lower-power mode should be re-associated again. In some embodiments, the client management data may also be sent to neighboring or sibling APs or network devices in order to indicate which clients should be transferred. In certain embodiments, the sibling APs may also opportunistically transfer or re-associate clients without direct input from the SEC.

Although a specific embodiment for operating a network device with a smart environmental controller when the network device may not be able to enter a lower-power mode suitable for carrying out the various steps, processes, methods, and operations described herein is discussed with respect to FIG. 7, any of a variety of systems and/or processes may be utilized in accordance with embodiments of the disclosure. For example, the process may be done by an AP, switch, router, or other network device. The elements depicted in FIG. 7 may also be interchangeable with other elements of FIGS. 1-6 and 8-9 as required to realize a particularly desired embodiment.

Figure 8:
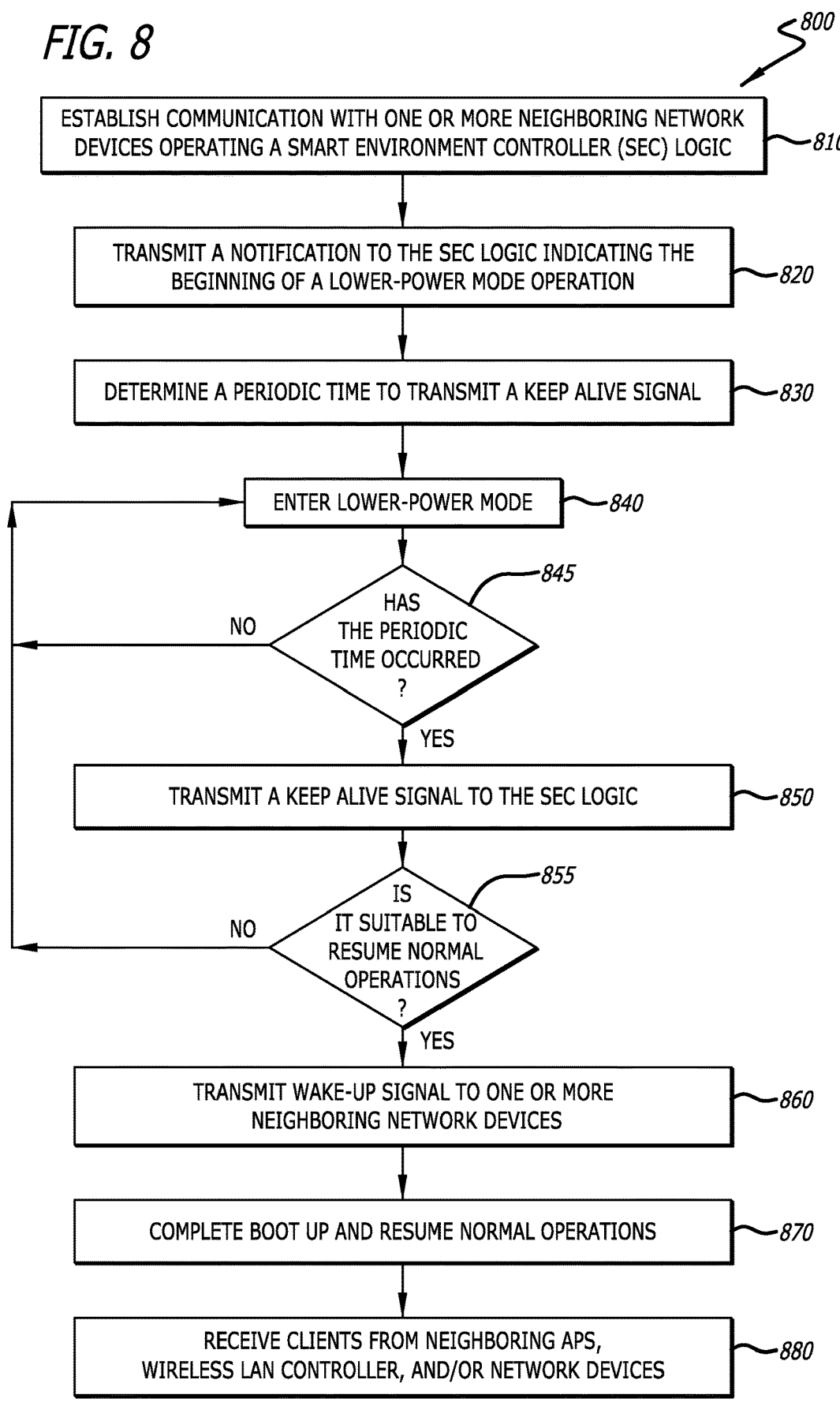
FIG. 8 is a flowchart depicting a process for a smart environmental controller to orchestrate network devices when the network device can resume operations within seconds in accordance with various embodiments of the disclosure.

Referring to FIG. 8, a flowchart depicting a process 800 for a smart environmental controller to orchestrate network devices when the network device can resume operations within seconds in accordance with various embodiments of the disclosure is shown. In many embodiments, the process 800 can establish one or more neighboring network devices operating a smart environment controller (SEC) logic (block 810). As stated above, in some embodiments, this may be a single device or can be distributed through a plurality of neighboring or sibling APs or other network devices. In a variety of embodiments, the AP or network device may be capable of exiting a lower-power mode and restore normal operations in a manner of seconds. These fast recovery devices may allow for a unique process when handling client re-association.

As such, in a number of embodiments, the process 800 can transmit a notification to the SEC indicating the beginning of a lower-power mode of operation (block 820). In these embodiments, the notification can be sent prior to entering lower-power mode or can be sent as the lower-power mode is being initiated. The notification can be configured as a direct message to the SEC or may be a general broadcast to the network of which the SEC may be able to receive and process. In still further embodiments, the network device can additionally transmit the notification to neighboring or sibling APs or network devices.

Prior to powering-down, the process 800 can determine a periodic time to transmit a keep alive signal (block 830). If an AP or network device enters a lower-power mode, it may still need to transmit a keep alive signal to indicate that it is still in that lower-power state and is capable of booting up in response to a triggering event. Therefore, based on a variety of factors, a keep alive signal period may be needed at a certain period of time. However, in certain embodiments, the need for a keep alive signal is not necessary.

In further embodiments, the process 800 can enter the lower-power mode or otherwise power down (block 840). In some embodiments, the AP or device can be capable of powering up after a power down within the matter of a few seconds. This feature can allow for different types of actions within the network and SEC when exiting the lower-power mode.

In more embodiments, the process 800 can determine if the periodic time has occurred (block 845). As previously discussed, a keep alive signal may need to be transmitted every so often across the network or to the SEC. When the periodic time has not occurred, the process 800 can continue to operate in a powered down state (block 840).

However, when the periodic time has occurred, the process 800 can transmit the keep alive signal to the SEC (block 850). In certain additional embodiments, the process 800 may also transmit the keep alive signal to neighboring or sibling APs. The keep alive signal may be transmitted directly to the SEC but may be broadcast to the other APs or network devices in distributed environments.

In additional embodiments, the process 800 can determine if it is suitable to resume normal operations (block 855). In other words, is it safe or needed to exit the lower-power mode. As discussed above, this can be triggered by a variety of events such as, but not limited to, a sudden change in the network state, a change in client needs, a change in neighboring or sibling APs, reception of a power over ethernet (POE) signal or from a signal received from one or more transceiver signals. If it is not suitable to resume normal operations, the process 800 can continue operation in lower-power mode (block 840).

However, when the conditions are suitable to resume normal operations, the process 800 can transmit a wake-up signal to the SEC (block 860). The wake-up signal can be transmitted prior to the wake-up process beginning (to indicate it will start to begin) or may be transmitted as the process is concluding or concluded. In certain embodiments, the signal may be transmitted directly to the SEC, however other embodiments may broadcast the message to the network, which the SEC may also receive. In still further embodiments, the network device can additionally transmit the wake-up signal to neighboring or distributed sibling APs or network devices.

In some embodiments, the process 800 can complete the full boot up and resume normal operations (block 870). As described above, this operation can be done in various embodiments within seconds for network devices that have that capability. Unlike previous embodiments discussed in relation to FIGS. 4-7, because of the fast reboot nature of the AP or network device, many embodiments do not require the SEC to directly receive client management data. In these instances, the process 800 can directly receive client from neighboring APs, wireless LAN controllers, and/or network devices (block 880). This coordination can be done in certain embodiments directly with sibling APs. In still more embodiments, the sibling APs may be configured with a distributed SEC logic system that can allow for this client re-association coordination between devices without the need to transfer client management data to the waking up AP or network device.

Although a specific embodiment for a smart environmental controller to orchestrate network devices when the network device can resume operations within seconds suitable for carrying out the various steps, processes, methods, and operations described herein is discussed with respect to FIG. 8, any of a variety of systems and/or processes may be utilized in accordance with embodiments of the disclosure. For example, the process may include a failsafe step that allows the waking up AP or network device to signal that it cannot restart within seconds and therefore processes similar to those discussed in FIGS. 4-7 may be required instead. The elements depicted in FIG. 8 may also be interchangeable with other elements of FIGS. 1-7 and 9 as required to realize a particularly desired embodiment.

Figure 9:
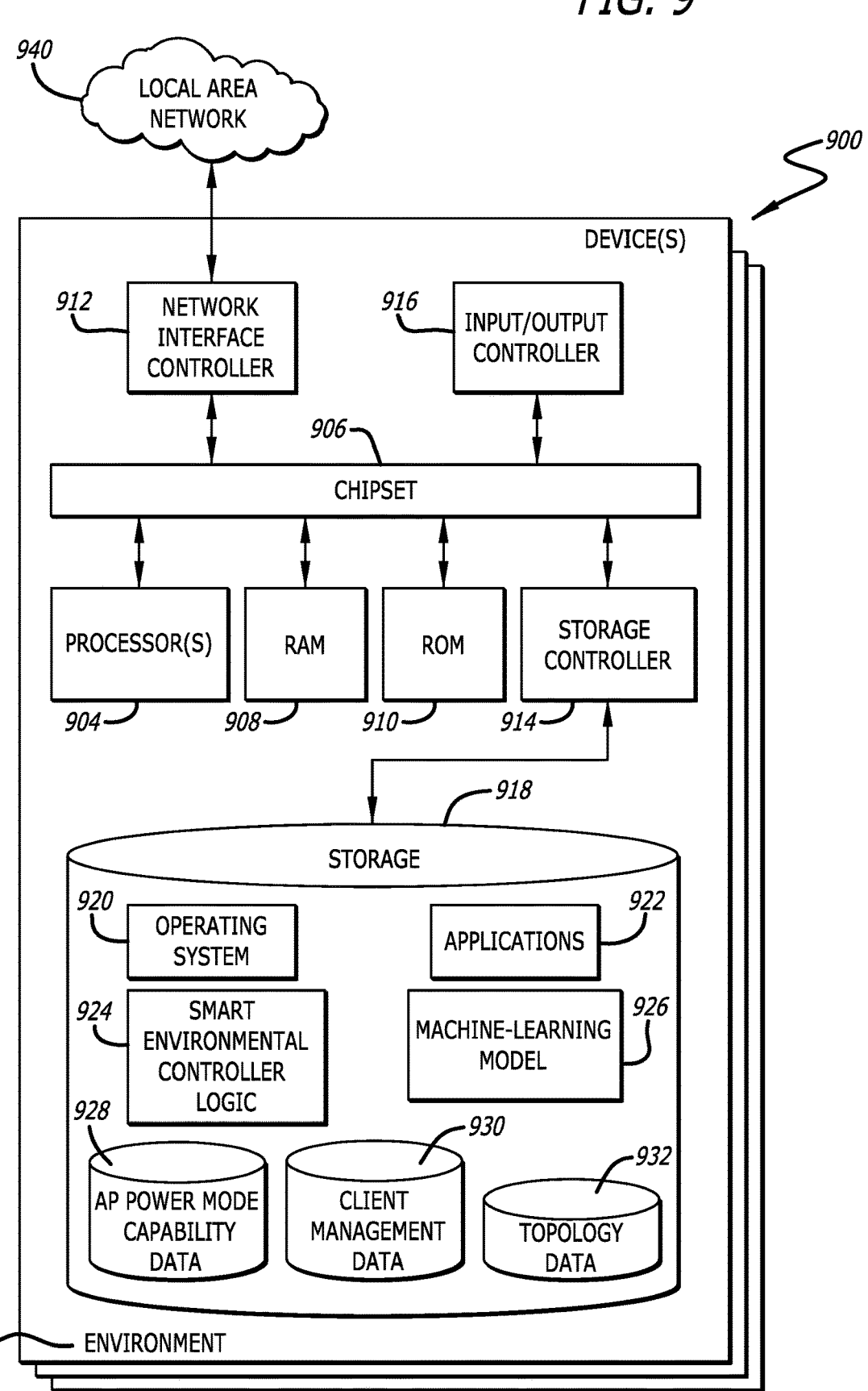
FIG. 9 is a conceptual block diagram of a device suitable for configuration with a smart environmental controller logic in accordance with various embodiments of the disclosure.

Referring to FIG. 9, a conceptual block diagram of a device suitable for configuration with a smart environmental controller logic in accordance with various embodiments of the disclosure is shown. The embodiment of the conceptual block diagram depicted in FIG. 9 can illustrate a conventional server computer, workstation, desktop computer, laptop, tablet, network appliance, e-reader, smartphone, or other computing device, and can be utilized to execute any of the application and/or logic components presented herein. The device 900 may, in some examples, correspond to physical devices or to virtual resources described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units ("CPUs") can be configured to operate in conjunction with a chipset 906. The processor(s) 904 can be standard programmable CPUs that perform arithmetic and logical operations necessary for the operation of the device 900.

In additional embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 906 may provide an interface between the processor(s) 904 and the remainder of the components and devices within the environment 902. The chipset 906 can provide an interface to a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Different embodiments of the device 900 can be configured to operate in a networked environment using logical connections to remote computing devices and computer systems through a network, such as the network 940. The chipset 906 can include functionality for providing network connectivity through a network interface card ("NIC") 912, which may comprise a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for example, store an operating system 920, applications 922, and data 928, 930, 932, which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

For example, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In various embodiment, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as application 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-8. In more embodiments, the device 900 can also include computer-readable storage media having instructions stored thereupon for performing any of the other computer-implemented operations described herein.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9 and can include other components that are not explicitly shown in FIG. 9 or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

In many embodiments, the device 900 can include a smart environmental controller logic 924 that can be configured to perform one or more of the various steps, processes, operations, and/or other methods that are described above. Often, the smart environmental controller logic 924 can be a set of instructions stored within a non-volatile memory that, when executed by the processor(s)/controller(s) 904 can carry out these steps, etc. In some embodiments, the smart environmental controller logic 924 may be a client application that resides on a network-connected device, such as, but not limited to, a server, switch, personal or mobile computing device in a single or distributed arrangement. In certain embodiments, the smart environmental controller logic 924 can direct the re-association of clients upon a network device, such as, but not limited to, an AP exiting a lower-power mode and resuming normal operations.

In a number of embodiments, the storage 918 can include AP power mode capability data 928. Each AP or other network device on a network can be configured to enter a lower-power mode. In some cases, this lower-power mode may be to simply remove power to the device and power it down. However, many devices are being equipped with various different or multiple lower-power mode options that can allow for the use of less electricity and data while being able to be woken up in a shorter amount of time than a typical full reboot requires. This can sometimes mean the different between needing minutes versus seconds to resume normal operations. The AP power mode capability data 928 can be configured to indicate and/or otherwise communicate to other devices on the network what type of lower-power mode operations are available on a certain network device. In some embodiments, the AP power mode capability data 928 may be present on the device itself and is transmitted and/or broadcast to other devices on the network. In some embodiments, the AP power mode capability data 928 can be accessed as sort of a database that can provide info related to an input such as the network device's model number, serial number, firmware version, and/or other indicating data. This AP power mode capability data 928 can be provided by the manufacturer, the network administrator, or derived based on test or past historical power cycles as observed on the network.

In various embodiments, the storage 918 can include client management data 930. As described above, each AP or network device can manage a plurality of clients. Each client may have a specific throughput need or reliability demands. These factors can be stored as client management data 930. Furthermore, various embodiments may configure the client management data 930 to update and keep track of each client and probabilities that it can be transferred to another neighboring or sibling AP or network device. In additional embodiments, the client management data 930 can store historical data related to clients such that future predictions, such as with the ML models 926 can be utilized to better handle client re-association after exiting a lower-power mode within a device on the network.

In still more embodiments, the storage 918 can include topology data 932. As discussed above, the topology data 932 can be collected in a variety of ways and may involve data related to multiple levels of the topology. The topology data 932 may be associated with an entire network or a portion/partition of a network. This may also include a relationship of the various sibling APs that are associated with each other AP or network device such that relationships of how to transfer clients back and forth can be determined based on the topology data 932 as currently understood.

Finally, in many embodiments, data may be processed into a format usable by a machine-learning model 926 (e.g., feature vectors), and or other pre-processing techniques. The machine-learning ("ML") model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926. The ML model 926 may be configured to learn the pattern of the client traffic flow of various network devices and generate predictions as to which neighboring or sibling AP would be best to transfer the client to in the event of initiating a lower-power mode. Conversely, the ML model 926 can be configured to determine which clients would be best suited for re-association with the AP or network device when it exits the lower-power mode.

The ML model(s) 926 can be configured to generate inferences to make predictions or draw conclusions from data. An inference can be considered the output of a process of applying a model to new data. This can occur by learning from at least the topology data, client management data, and/or the AP power mode capability data and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 926 may be generated by human/administrator verifications or may compare predicted outcomes with actual outcomes.

Although a specific embodiment for a device suitable for configuration with a smart environmental controller logic suitable for carrying out the various steps, processes, methods, and operations described herein is discussed with respect to FIG. 9, any of a variety of systems and/or processes may be utilized in accordance with embodiments of the disclosure. For example, the device may be in a virtual environment such as a cloud-based network administration suite, or it may be distributed across a variety of network devices or APs such that each acts as a device and the smart environmental controller logic 924 acts in tandem between the devices. The elements depicted in FIG. 9 may also be interchangeable with other elements of FIGS. 1-8 as required to realize a particularly desired embodiment.

Information Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
at least one network interface controller configured to provide access to a network; and a memory communicatively coupled to the processor, wherein the memory comprises
a smart environmental controller (SEC) logic that is configured to:
establish communication with an access point (AP) via the at least one network interface controller, wherein the AP is associated with a plurality of clients;
receive AP power mode capability data;
parse the AP power mode capability data;
receive a notification that the AP will enter a lower-power mode;
receive a wake-up signal from the AP;
track a floorplan location of clients that are in an area of restoral covered by at least the AP upon waking of the AP from the lower power mode;
utilize the parsed AP power mode capability data and the tracked floorplan locations of the clients to determine which of the plurality of clients should be transferred back to the AP upon wake-up;
generate client management data based on the determined plurality of clients; and
transmit the generated client management data to the AP;
wherein the SEC is further configured to determine the clients suitable for re-association based on at least a lower-power mode type utilized by the AP upon its waking-up.

2. The device of claim 1, wherein the AP power mode capability data is received from the AP.

3. The device of claim 2, wherein the AP power mode capability data comprises one or more low power settings available within the AP.

4. The device of claim 3, wherein the one or more low power settings comprise at least: entering the lower-power mode, entering a hibernation mode, or powering down the AP.

5. The device of claim 1, wherein the client management data comprises a list of clients that should be re-associated with the AP upon wake-up.

6. The device of claim 5, wherein the AP is associated with one or more sibling APs within communication range of the AP.

7. The device of claim 6, wherein the clients to be re-associated are associated with the one or more sibling APs.

8. The device of claim 1, wherein the smart environmental controller logic is further configured to receive a notification that the AP has resumed normal operations.

9. A network device, comprising:
a processor;

at least one network interface controller configured to provide access to a network;
a plurality of clients being serviced by the network device; and
a memory communicatively coupled to the processor, wherein the memory comprises a smart environmental controller logic that is configured to:
establish communication with an external smart environmental controller (SEC) via the at least one network interface controller;
generate AP power mode capability data;
transmit the AP power mode capability data to the SEC;
determine that it is suitable to initiate a lower-power mode;
transmit a notification to the SEC that the lower-power mode is being initiated;
enter the lower-power mode;
initiate wake up from the lower-power mode;
transmit a wake-up signal to the SEC, wherein the SEC performs tracking of one or more floorplan locations of clients that are in an area of restoral of the network device upon waking of the network device from the lower power mode;
receive client management data from the SEC, wherein the client management data is generated at the SEC by utilizing the AP power mode capability data and the tracked floor plan locations of the clients; and
re-establish an association with the clients indicated within the client management data;
wherein the SEC is further configured to determine the clients suitable for re-association based on at least a lower-power mode type utilized by the network device upon its waking-up.

10. The network device of claim 9, wherein the smart environmental controller logic is further configured to transmit a notification to the SEC that normal operations have resumed.

11. The network device of claim 9, wherein the AP power mode capability data comprises one or more low power settings available within the AP.

12. The network device of claim 9, wherein the network device is associated with one or more sibling network devices.

13. The network device of claim 12, wherein the smart environmental controller logic is further configured to transmit a notification to the one or more sibling network devices when it is determined that it is suitable to enter the lower-power mode.

14. The network device of claim 13, wherein the one or more sibling network devices can associate with and service at least one of the plurality of clients.

15. The network device of claim 12, wherein the smart environmental controller logic is further configured to transmit a wake-up signal to the one or more sibling devices.

16. The network device of claim 15, wherein the re-established clients are received from the one or more sibling network devices.

17. The network device of claim 16, wherein the smart environmental controller logic is further configured to receive additional clients from the one or more siblings network devices that are not indicated in the client management data.

18. A method of orchestrating lower-power modes in network devices, comprising:
establishing communication with an access point (AP), wherein the AP is associated with a plurality of clients;
receiving AP power mode capability data from the AP;

parsing the received AP power mode capability data to determine lower-power mode capabilities of the AP;

receiving a notification that the AP will enter a lower-power mode;

receiving a wake-up signal from the AP;

tracking a floorplan location of clients that are in an area of restoral covered by the AP upon waking from the lower power mode;

utilize the parsed AP power mode capability data and the tracked floorplan locations of the clients to determine which of the plurality of clients should be transferred back to the AP upon wake-up;

generating client management data based on the determined plurality of clients; and transmitting the generated client management data to the AP; and configuring a SEC to determine the clients suitable for re-association based on at least a lower-power mode type utilized by the AP upon its waking-up.

* * * * *